United States Patent [19]

Berniolles et al.

[11] 4,101,377
[45] Jul. 18, 1978

[54] FAST NEUTRON REACTOR

[75] Inventors: Jean-Marie Berniolles, Pierrevert; Patrick Jogand, Aix en Provence, both of France

[73] Assignee: Commissariat a l'Energie Atomique, Paris, France

[21] Appl. No.: 781,428

[22] Filed: Mar. 25, 1977

[30] Foreign Application Priority Data

Mar. 29, 1976 [FR] France .................... 76 09082
May 4, 1976 [FR] France .................... 76 13275

[51] Int. Cl.² ............................................. G21C 15/00
[52] U.S. Cl. ................................. 176/40; 176/65; 165/160; 165/74
[58] Field of Search ............ 176/65, 40, 87, 38, 176/50, 61; 165/158, 160, 74

[56] References Cited

U.S. PATENT DOCUMENTS 3,333,630  8/1967  Charcharos .................... 165/160
3,784,443  1/1974  Vercasson .................... 176/40

FOREIGN PATENT DOCUMENTS 2,217,863  12/1972  Fed. Rep. of Germany ......... 176/65

Primary Examiner—Harvey E. Behrend
Attorney, Agent, or Firm—Cameron, Kerkam, Sutton, Stowell & Stowell

[57] ABSTRACT

A cylindrical inner vessel containing the reactor core is placed coaxially within a main vessel. Heat exchangers are disposed within the annular space formed between the two vessels, each heat exchanger being delimited by an outer shell and a coaxial inner shell which surrounds a central feed duct having a vertical axis. The upper end of the annular space communicates with a flared end portion of the central duct through a first circular window formed in the inner shell. The lower end of the annular space communicates with the region located between the inner vessel and the main vessel through a second circular window formed in the outer shell.

10 Claims, 4 Drawing Figures

FAST NEUTRON REACTOR

This invention relates to a fast neutron reactor comprising in particular a main metallic vessel having a vertical axis and surrounded by a containment vault. The open-topped end of the vessel is suspended from a shield slab or roof of substantial thickness which forms a closure for the vault. The vessel contains a liquid metal coolant usually consisting of sodium. The reactor core which is immersed beneath the level of liquid metal is also placed within said inner vessel. This latter can be so arranged as to be either supported on a diagrid carried by the main vessel or suspended from the reactor vault roof.

In an arrangement of this type, the hot liquid metal discharged from the reactor core after passing through this latter in contact with the fuel assemblies and gaining heat generated by the fission reaction within said assemblies arrives above the reactor core within the inner vessel. The heat exchangers and circulating pumps are disposed at intervals within the intermediate space formed between said inner vessel and the main vessel. The hot liquid metal derived from the inner vessel is fed to the heat exchangers, discharged from the outlets of these latter after cooling and then returned into the intermediate space. The cooled liquid metal is sucked from said space by means of the circulating pumps, then discharged through large-section ducts beneath the diagrid at a sufficient pressure to pass upwards again through the reactor core, thus establishing a continuous circulation of liquid metal between the two vessels.

In this constructional design, the inner vessel and the heat exchangers located between the main vessel and said inner vessel are interconnected in particular by means of ducts or like means which are branched laterally on the inner vessel and connected to cylindrical enclosures surrounding inlets formed at the top portion of each heat exchanger. This arrangement offers a number of different advantages which consist especially of a reduction in volume of the hot liquid metal, namely a volume limited solely to that region of the inner vessel which is located above the reactor core, and of a simple construction of said vessel. A final advantage lies in the suppression of ancillary cooling circuits to be associated with the internal wall of the main vessel, the entire quantity of liquid metal contained in this latter being cooled metal derived from the outlets of the heat exchangers. However, this solution makes it necessary to provide a large number of concentric rings of circulation tubes within each heat exchanger in order to ensure suitable flow distribution. Furthermore, the connecting ducts between the inner vessel and the cylindrical enclosures surrounding the heat exchangers must be associated with means for preventing the hot liquid metal from flowing directly to the space located between the two vessels without passing through the heat exchangers. This accordingly gives rise to certain difficulties of construction by reason of expansion of metallic components as a result of temperature differences.

The present invention relates to a fast neutron reactor which makes use of a different arrangement for the heat exchangers mounted between the main vessel and the inner vessel. It is a primary objective of this arrangement to ensure better distribution of the hot liquid metal at the inlets of said heat exchangers and more efficient heat insulation between the hot liquid metal and the cold liquid metal collected within the space which forms a separation between the main vessel and the inner vessel. A further aim of the invention is to permit appreciable simplification in the design of the ducts which provide a connection between the heat exchangers and the inner vessel.

To this end, the invention relates to a nuclear reactor in which a volume of liquid coolant metal is contained within a metallic main vessel having a vertical axis and an open-topped end suspended from a shield roof of substantial thickness forming a closure for a containment vault which surrounds said vessel, there being also placed within said main vessel an inner vessel having a cylindrical wall for containing the reactor core which is immersed beneath the level of the liquid metal, provision being made within the intermediate space between the main vessel and the inner vessel for heat exchangers and pumps immersed beneath the level of the liquid metal, each heat exchanger being such as to have an annular shape defined by an inner shell and an outer shell in parallel relation and provided with a plurality of heat-transfer tubes extending vertically over the greater part of their length, said tubes being in contact externally with the liquid metal which passes through the heat exchanger and arranged in concentric rings between the two shells, said tubes being such as to have their openings in two end tube-plates which delimit with the two shells of the heat exchanger two manifolds consisting respectively of an inlet manifold at the lower end of the heat exchanger and an outlet manifold at the upper end for a heat-transfer fluid which serves to collect the heat gained by the liquid metal as it passes through the reactor core, wherein the inner shell surrounds a central feed duct having a vertical axis and joined to the inner vessel and wherein the annular space between the two shells communicates at the upper end thereof with a flared portion of the central duct through a first circular window formed in the inner shell and at the lower end thereof with the region located between the inner vessel and the main vessel through a second circular window formed in the outer shell.

In accordance with a distinctive feature, the manifold which is placed at the lower end for the supply of the heat-transfer tubes is connected to a plurality of ducts for supplying the heat-transfer fluid, said ducts being arranged at intervals at the periphery of the outer shell of the heat exchanger.

In accordance with another distinctive feature, the central supply duct has two tubular elements which fit one inside the other with provision for a clearance space, one element aforesaid being connected to an elbowed extension provided at the lower end of the axial duct and connected to the inner vessel by means of an orifice formed in the lateral wall of said vessel and the other element being connected to the window formed in the inner shell of the heat exchanger, the clearance space between the two elements aforesaid being filled with a volume of stagnant liquid metal, there being placed above said volume an inert gas blanket which is trapped between the axial duct and the inner shell.

In a particular embodiment of the invention and especially with a view to increasing the height of the heat exchanger tubes, the elbowed extension of the central duct is connected to the inner vessel in the lower portion of said vessel, there being formed between the internal surface of said vessel and the reactor core an annular space in which the hot liquid metal discharged from the reactor core flows downwards before being collected by said elbowed extension and conveyed to the heat exchanger.

In an alternative embodiment, the elbowed extension of the central duct is surrounded by a jacket defining a recirculation space supplied by liquid metal leakages collected at the base of the inner vessel, said recirculation space being in communication with the upper end of the central duct within the clearance space formed between the two elements which constitute said duct.

In a further embodiment of the heat exchanger under consideration, the heat-transfer tubes are elbowed at least at one end thereof in order to be joined to a tube-plate of cylindrical shape which defines an annular manifold for the intermediate fluid. In accordance with an alternative arrangement, the annular manifold defined by the cylindrical tube-plate into which open the ends of the elbowed tubes is disposed coaxially with the shells of the heat exchanger externally of this latter.

In the embodiment described above, the liquid metal passes externally in contact with the tubes through which the intermediate fluid flows internally and is then discharged from the heat exchanger at one end of this latter, usually the lower end, without any change of direction. This results in a number of different advantages, both from the standpoint of efficiency of heat transfer and in regard to convenience of use of the heat exchanger. In particular, an improvement is achieved in the distribution of velocities of the liquid metal within the bank of heat-exchanger tubes. This has the effect of reducing vibrations and eliminating streams of liquid metal which are formed in conventional designs as the liquid metal is discharged through the radial windows provided in the outer shell.

Other cases in which the invention proves to be of particular interest in actual use are those in which heat exchangers of large diameter are employed and especially annular heat exchangers which can be equipped in each case with a pump placed within the interior or alternatively provided with a central chimney for the supply of liquid metal.

Finally, in another order of ideas, it is worthy of note that these arrangements in no way imply any basic assumptions in the arrangement of the pumps which serve to convey the liquid metal either into or from the reactor vessel. In particular, these pumps can be located in the vicinity of the bottom of the main vessel. This arrangement promotes efficient operation of the pumps by increasing the suction head.

Further properties and advantages of a fast neutron reactor as constructed in accordance with the invention will become apparent from the following description of one exemplified embodiment which is given by way of indication and not in any limiting sense, reference being made to the accompanying drawings, wherein.

Figure 1:
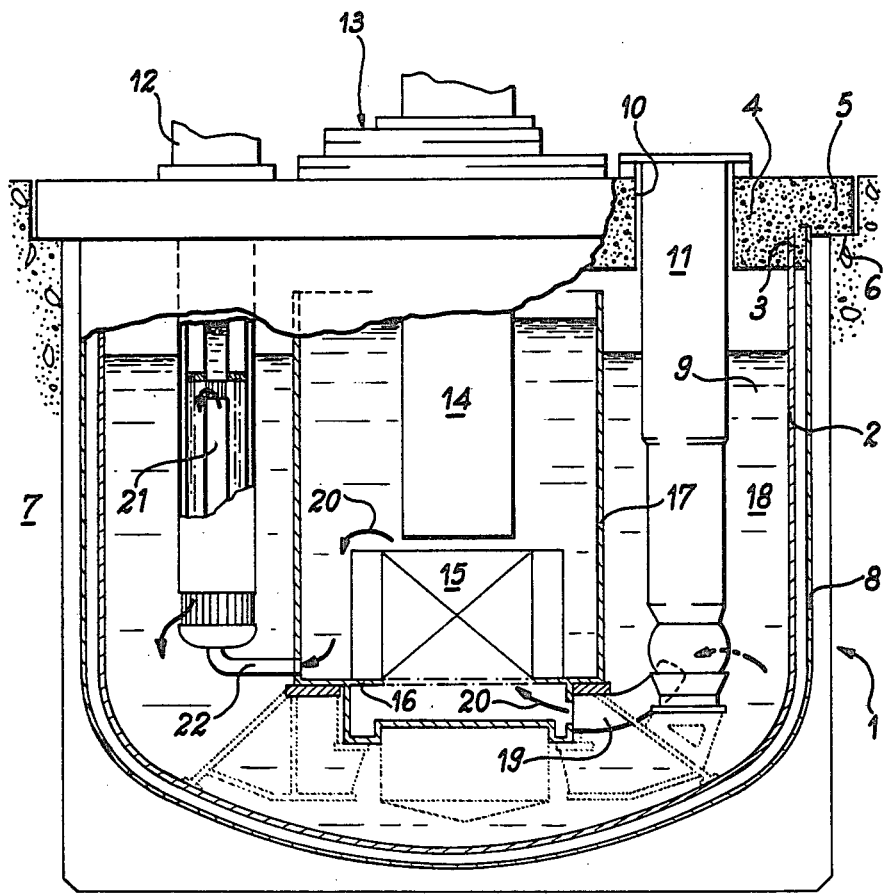
FIG. 1 is a diagrammatic vertical sectional view of a fast reactor provided in particular with a series of heat exchangers and a cylindrical inner vessel arranged in accordance with the invention.

In FIG. 1, the reference numeral 1 designates a fast reactor of a general type known per se in which it is apparent that the essential elements are shown diagrammatically. This reactor comprises in particular a metallic vessel 2 or so-called main vessel having a cylindrical wall and a substantially hemispherical bottom wall, said vessel being suspended from a closure and shield roof 4 of suitable thickness by means of the upper end 3 of said vessel. Said roof 4 is provided with a peripheral rim 5 which serves to support this latter as well as the vessel on the corbel 6 of a containment vault 7 usually constructed of concrete and placed around the vessel in order to ensure protection of the external environment. The main vessel 2 is surrounded by a second vessel 8 having parallel walls or so-called safety vessel which is also suspended from the vault roof 4.

The main vessel 2 contains a sufficient volume 9 of a reactor coolant liquid usually consisting of liquid metal and more particularly of sodium. The reactor vault roof 4 which forms a closure for the vessels 2 and 8 at the upper ends of these latter is provided with a series of passageways 10, the structural elements which are necessary for the operation of the reactor being intended to pass through said vault roof in leak-tight manner and being also suspended from this latter so as to be immersed in the volume 9 of liquid metal within the vessel 2. These structural elements are constituted in particular by pumps 11 and heat exchangers 12 suitably disposed at intervals about the vertical axis of the main vessel 2, the heat exchangers being usually separated by pumps and conversely.

The central portion of the reactor vault roof 4 is also fitted with a system 13 consisting of a number of rotating shield plugs so designed that a handling and monitoring unit 14 shown diagrammatically in FIG. 1 is capable of coming into position above the reactor core 15 in order to control the operation of this latter and carry out the necessary operations which entail handling of fuel assemblies within the core.

The reactor core 15 is supported in the usual manner on a diagrid 16, the peripheral portion of which is joined to a cylindrical vessel 17 or so-called inner vessel which is consequently mounted within the main vessel 2 and divides the volume 9 of liquid metal within this latter into two parts.

The inner vessel 17 aforesaid serves in particular to collect the hot liquid metal as this latter is discharged from the upper end of the reactor core after gaining the heat generated as a result of nuclear fission within the core fuel assemblies (not shown in the drawings).

In contrast, the intermediate space 18 formed between the inner vessel 17 and the main vessel 2 contains the cooled liquid metal delivered in particular by the heat exchangers 12 which are in turn supplied with hot liquid metal from the vessel 17. The cooled liquid metal is then recirculated by the circulating pumps 11 within the space 18 in order to be returned to the outlets of said pumps via large-section ducts 19 beneath the diagrid for a further passage through the reactor core 15. The direction of circulation of the liquid metal is shown diagrammatically by arrows 20.

Figure 2:
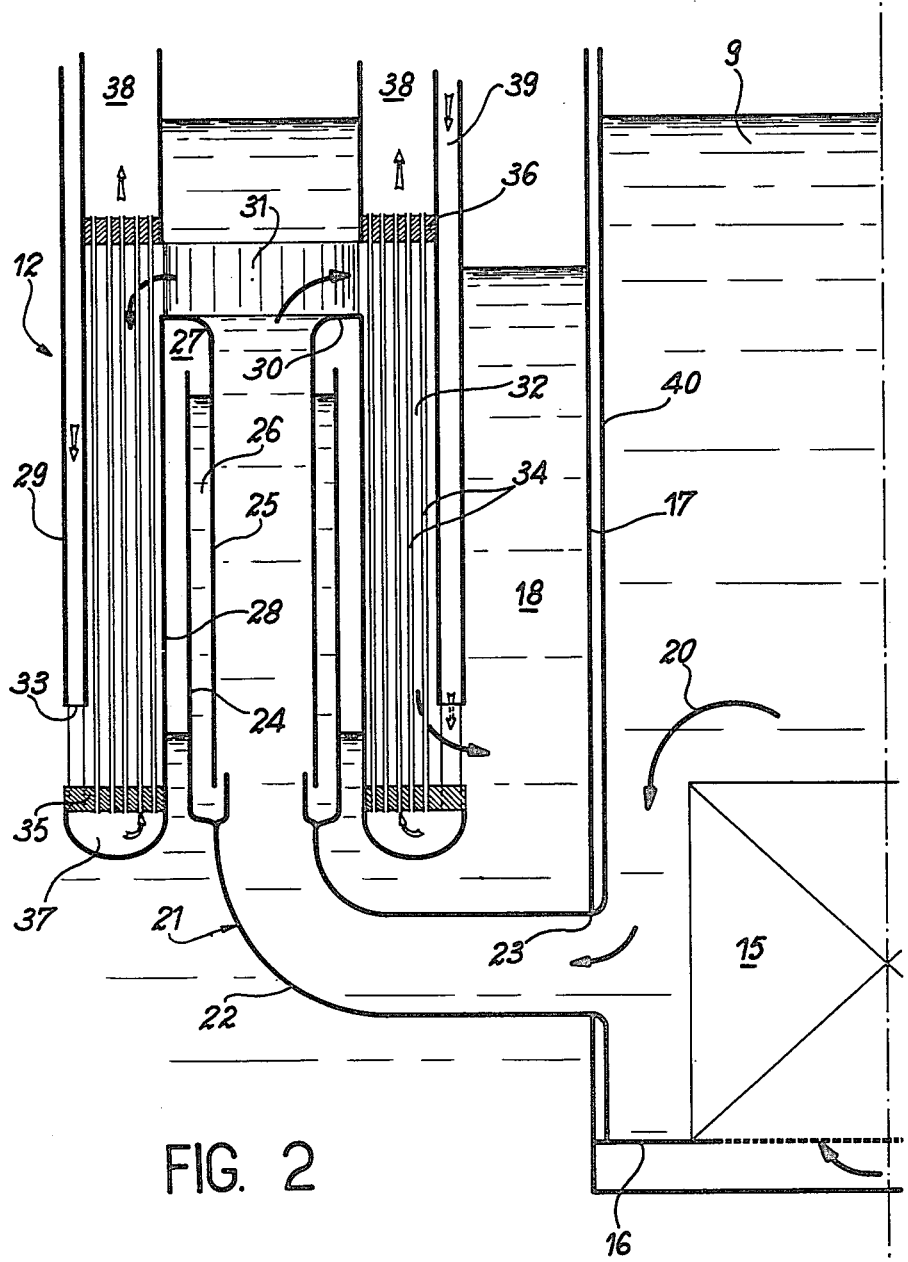
FIG. 2 is a detail sectional view to a larger scale showing the heat exchanger and the inner vessel and more especially the method adopted for connecting these two units.

The particular constructional design which is adopted in accordance with the invention for each heat exchanger of the installation is illustrated more especially in FIG. 2.

In this figure, the heat exchanger mainly comprises a central feed duct 21 having a vertical axis, the lower end of said duct being provided with an extension in the form of an elbowed portion 22 which opens into the inner vessel 17 through an orifice 23 formed in the lateral wall of this latter. The position of said orifice 23 in the lower portion of the wall of the vessel 17 is chosen so as to ensure that there is no limitation in height of the heat exchanger and consequently in length of the heat-transfer tubes with which this latter is provided. This arrangement makes it necessary in particular to make provision between the reactor core 15 and the inner wall of the vessel 17 for a suitable space in which the hot liquid metal discharged from the reactor core is permitted to flow downwards along said wall in the direction of the arrows 20 so as to reach the orifice 23 and the duct 21.

In that portion which penetrates into the heat exchanger 12, the duct 21 is constituted by two interengaged tubular elements 24 and 25 respectively, the outer element 24 being intended to form an extension of the lower elbowed duct 22 whilst the inner duct 25 is mounted within the first so as to form between these latter an annular space 26 filled with stagnant liquid metal. An inert gas blanket 27 is present above the liquid metal surface and imprisoned between the top portion of the duct 21 and the inner shell 28 of the heat exchanger 12. Said inner shell 28 is associated with an outer shell 29 in coaxial relation with the first and with the central feed duct 21. The upper extension of the tubular element 25 of the duct 21 is connected to the inner shell 28 by means of a flared end portion 30 opposite to a circular window 31 through which the liquid metal conveyed into the heat exchanger via the central duct 21 is permitted to penetrate into the space 32 formed between the shells 28 and 29. Said liquid metal thus circulates in the upward direction within the annular space 32 and is discharged from this latter through a second window 33 formed at the base of the outer shell 29.

Vertical heat-transfer tubes 34 are arranged at intervals within the space 32 which is thus defined by the shells 28 and 29, said tubes being disposed in a series of concentric rings and joined at the lower and upper ends thereof to two tube-plates 35 and 36 respectively so as to define manifolds 37 and 38 for the admission and discharge of a heat-transfer fluid. Said manifolds serve to collect the heat transported by the liquid metal derived from the inner vessel so as to restitute said heat to a steam generator (not shown) which is located outside the reactor. As a general rule, this heat-transfer fluid is also a liquid metal and preferably of the same nature as the liquid metal which is circulated within the reactor vessels. Said fluid is conveyed to the admission manifold 37 via tubes 39 which are disposed at uniform intervals at the periphery of the heat exchanger in the vicinity of the outer shell 29.

In the example of construction illustrated in FIG. 2, the internal wall of the vessel 17 is lined on the side facing the reactor core with a protective baffle-plate 40, the spaced formed between the vessel 17 and said baffle-plate being filled with stagnant liquid metal which forms a separation between the hot liquid metal within the vessel and the cold liquid metal within the space 18. The space thus protects the wall of the vessel 17 from abrupt variations in temperature which are liable to occur, especially in the event of emergency shutdown of the reactor.

Figure 3:
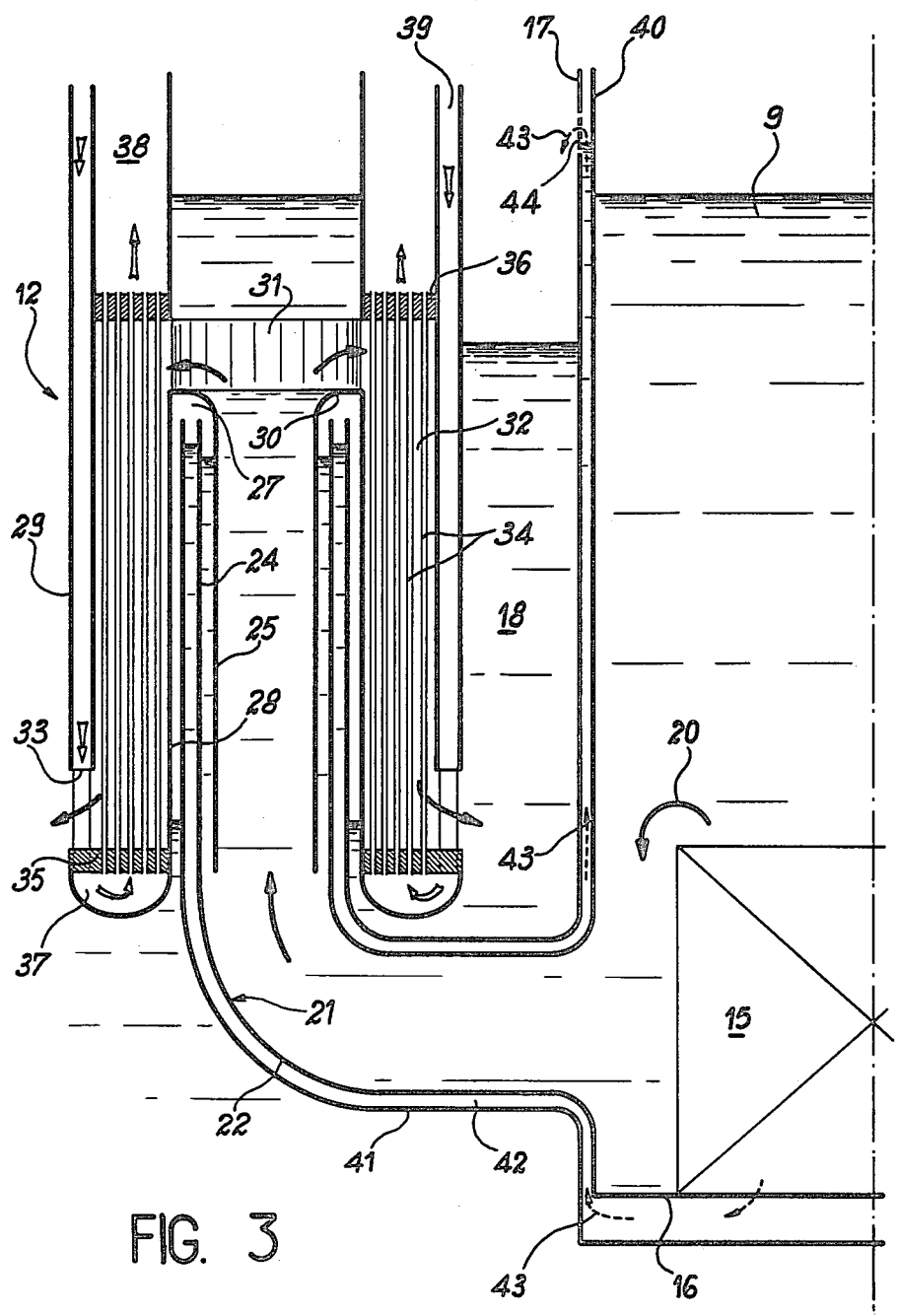
FIG. 3 is a sectional view of an alternative embodiment.

In another alternative embodiment which is illustrated in FIG. 3, liquid metal is circulated within the space formed between the vessel 17 and the baffle-plate 40. In particular, this space communicates with the region located beneath the core support diagrid 16 for the purpose of collecting leakages from the end-fittings of the fuel assemblies (not shown). To this end, the elbowed duct 22 is surrounded by a jacket 41 which defines an annular duct 42 filled with stagnant liquid metal whilst an upflowing stream of liquid metal circulates in the direction of the arrows 43 shown in dashed lines and cools the internal wall of the vessel 17. After reaching the top portion of said vessel 17, the stream is discharged into the space 18 by means of drilled holes 44 provided around the entire periphery of the wall.

Figure 4:
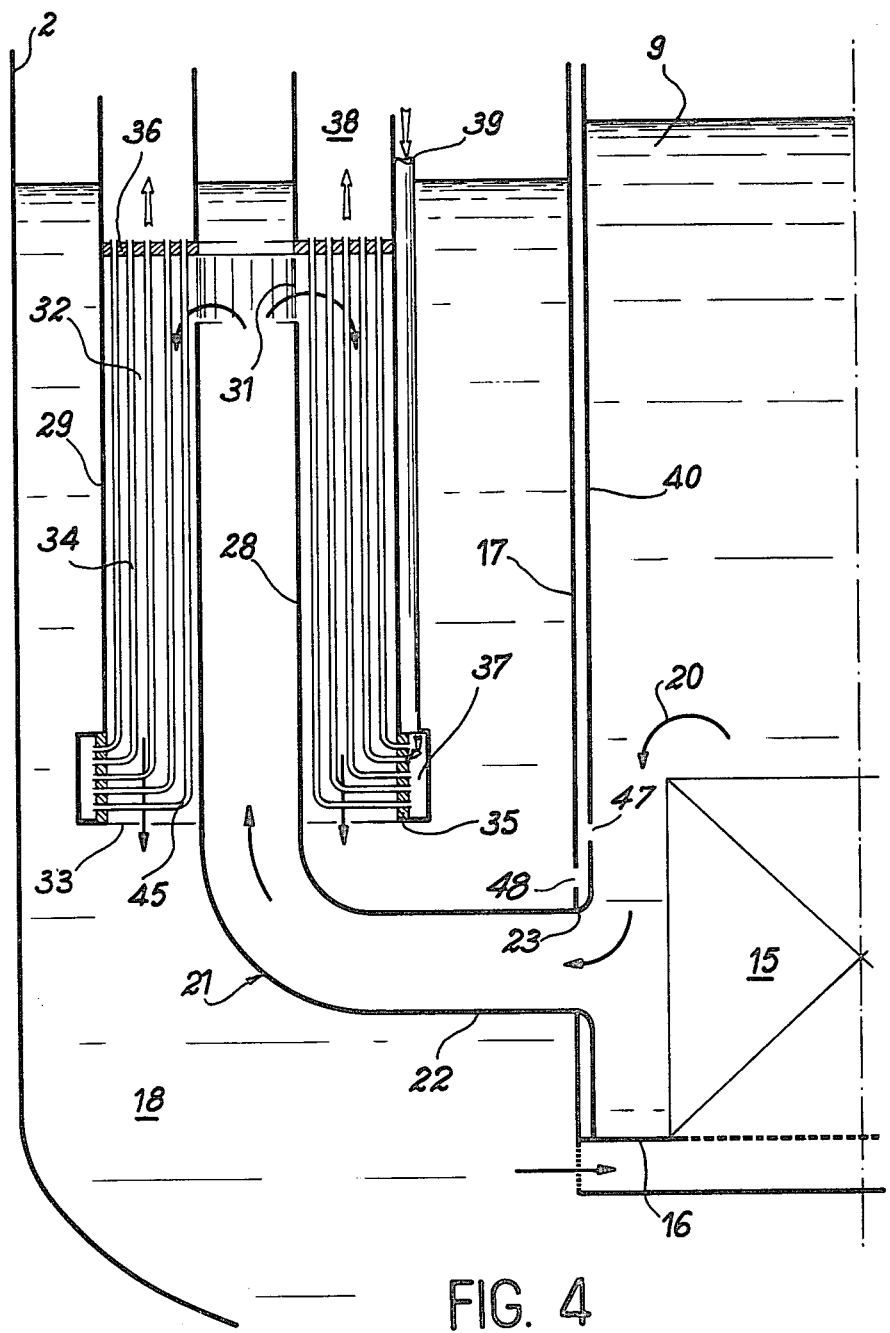
FIG. 4 illustrates another alternative embodiment.

FIG. 4 illustrates another alternative embodiment in which the reference numerals employed are identical with those which appear in FIG. 2 in particular. Thus, there is again shown in this figure the axial feed duct 21, the window 31 formed in the inner shell 28 through which the liquid metal penetrates into the heat exchanger, the bank of heat-transfer tubes 34, the tube-plates 35 and 36 and finally the manifolds 37 and 38 together with the feed ducts 39 of the bottom manifold 37. In this alternative embodiment, however, it is apparent that the heat-transfer tubes 34 within the space 32 are elbowed at their lower ends 45; the corresponding tube-plate 35 extends in this case in the form of a cylinder which is coaxial with the heat-exchanger shells 28 and 29. The intermediate heat-transfer fluid collected in the annular manifold 37 passes upwards through the tubes 34 in order to be collected at the outlets of said tubes above the top horizontal tube-plate 36 within the discharge manifold 38. Said tubes 34 are surrounded externally by the liquid metal which penetrates into the heat exchanger through the windows 31 formed above the axial duct 21. Said liquid metal flows downwards through the heat exchanger and is discharged at the lower end of this latter through the window 33 formed in this case beneath the heat exchanger without undergoing any change of direction.

There is thus provided a fast neutron reactor which combines the use of an inner vessel of very simple design with that of a heat exchanger of annular type which ensures better distribution of velocities of the liquid metal and simplification of the necessary means for producing a connection with the inner vessel. The arrangements in accordance with the invention make it possible in particular to facilitate any remedial work on the heat exchangers or the inner vessel while also ensuring better insulation between said heat exchangers and the space between main vessel and inner vessel for collecting the cold liquid metal at the outlets of said heat exchangers. It should be noted in addition that the arrangement of the elbowed heat-transfer tubes has the advantage of preventing any interference between on the one hand the liquid metal flowing into or from the heat exchanger and on the other hand the circuits for supply or discharge of the intermediate fluid.

Finally, it must be understood that the level of connection of the axial feed tube of the heat exchanger with respect to the wall of the inner vessel as employed in the design solutions of FIGS. 2 to 4 can be adapted to the particular conditions of operation of the installation. As a notable example, said level of connection can be located practically in the vicinity of the diagrid. Moreover, thermal insulation of the inner vessel 17 and of the feed duct 21 can be achieved by means of a layer of stagnant liquid metal, for example by putting the annular space formed by the vessel 17 and the baffle-plate 40 directly into communication either with the inner region of said vessel by means of drilled holes 47 (as shown in FIG. 4) or with the outer region by means of another set of drilled holes 48.

We claim:

1. A fast neutron reactor in which a volume of liquid coolant metal is contained within a metallic main vessel having a vertical axis and an open-topped end suspended from a shield roof of substantial thickness forming a closure for a containment vault which surrounds said vessel, there being also placed within said main vessel an inner vessel having a cylindrical wall for containing the reactor core which is immersed beneath the level of the liquid metal, provision being made within the intermediate space between the main vessel and the inner vessel for heat exchangers and pumps immersed beneath the level of the liquid metal, each heat exchanger being such as to have an annular shape defined by an inner shell and an outer shell in parallel relation and provided with plurality of heat-transfer tubes extending vertically over the greater part of their length, said tubes being in contact externally with the liquid metal which passes through the heat exchanger and arranged in concentric rings between the two shells, said tubes being such as to have their openings in two end tube-plates which delimit with the two shells of the heat exchanger two manifolds consisting respectively of an inlet manifold at the lower end of the heat exchanger and an outlet manifold at the upper end for a heat-transfer fluid which serves to collect the heat gained by the liquid metal as it passes through the reactor core, wherein the inner shell surrounds a central feed duct having a vertical axis and joined to the inner vessel and wherein the annular space between the two shells communicates at the upper end thereof with a flared portion of the central duct through a first circular window formed in the inner shell and at the lower end thereof with the region located between the inner vessel and the main vessel through a second circular window formed in the outer shell.

2. A nuclear reactor according to claim 1, wherein the bottom manifold for the supply of the heat-transfer tubes is connected to a plurality of ducts for supplying the heat-transfer fluid, said ducts being arranged at intervals at the periphery of the outer shell of the heat exchanger.

3. A nuclear reactor in accordance with claim 1, wherein the central feed duct has two tubular elements which fit one inside the other with provisions for a clearance space, one element aforesaid being connected to an elbowed extension provided at the lower end of the axial duct and connected to the inner vessel by means of an orifice formed in the lateral wall of said vessel and the other element being connected to the window formed in the inner shell of the heat exchanger, the clearance space between the two elements aforesaid being filled with a volume of stagnant liquid metal, there being placed above said volume an inert gas blanket which is trapped between the axial duct and the inner shell.

4. A nuclear reactor according to claim 1, wherein the elbowed extension of the central duct is connected to the inner vessel in the vicinity of the lower end of said vessel, there being formed between the internal surface of said vessel and the reactor core an annular space in which the hot liquid metal discharged from the reactor core flows downwards before being collected by said elbowed extension and conveyed to the heat exchanger.

5. A nuclear reactor according to claim 1, wherein the elbowed extension of the central duct is surrounded by a jacket defining an annular space which communicates against the wall of the inner vessel with a thermal insulation region provided between said wall and a parallel baffle-plate.

6. A nuclear reactor according to claim 5, wherein leakages of liquid metal collected at the base of the inner vessel are circulated through the annular space, said space being intended to communicate with the upper end of the central duct within the clearance space formed between the two elements which constitute said duct.

7. A nuclear reactor according to claim 5, wherein the annular space contains a layer of stagnant liquid metal, said space being intended to communicate with the inner region of the inner vessel or with the outer region.

8. A nuclear reactor according to claim 1, wherein the heat-transfer tubes are elbowed at least at one end in order to be joined to a tube-plate of cylindrical shape which defines an annular manifold for the intermediate fluid.

9. A nuclear reactor according to claim 8, wherein the annular manifold defined by the cylindrical tube-plate in which the ends of the elbowed tubes have their openings is disposed in coaxial relation with the shells of the heat exchanger externally of said heat exchanger.

10. A nuclear reactor in accordance with claim 6, wherein the annular manifold defined by the cylindrical tube-plate in which the ends of the elbowed tubes have their openings is disposed in coaxial relation with the shells of the heat exchanger either externally or internally of the said heat exchanger.

* * * * *